US007952063B2

(12) United States Patent
Peters (10) Patent No.: US 7,952,063 B2
(45) Date of Patent: May 31, 2011

(54) METHOD AND SYSTEM FOR OPERATING A POINTING DEVICE TO CONTROL ONE OR MORE PROPERTIES OF A PLURALITY OF OTHER DEVICES

(75) Inventor: Jochen Peters, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 312 days.

(21) Appl. No.: 11/572,580

(22) PCT Filed: Jul. 11, 2005

(86) PCT No.: PCT/IB2005/052281
§ 371 (c)(1),
(2), (4) Date: Jan. 24, 2007

(87) PCT Pub. No.: WO2006/013479
PCT Pub. Date: Feb. 9, 2006

(65) Prior Publication Data
US 2008/0265143 A1    Oct. 30, 2008

(30) Foreign Application Priority Data

Jul. 28, 2004   (EP) .................................... 04103643

(51) Int. Cl.
*G06F 3/042*   (2006.01)
(52) U.S. Cl. ............. 250/221; 250/214 D; 250/214 SW; 398/106; 398/111
(58) Field of Classification Search .................. 250/221, 250/214 D, 214 SW; 398/106, 111
See application file for complete search history.

(56) References Cited

U.S. PATENT DOCUMENTS

| 5,719,622 | A | 2/1998 | Conway et al. |
| 2001/0030668 | A1* | 10/2001 | Erten et al. ..................... 345/863 |
| 2003/0107888 | A1 | 6/2003 | Devlin et al. |
| 2003/0117367 | A1 | 6/2003 | Yan |
| 2003/0178554 | A1 | 9/2003 | Zak |

FOREIGN PATENT DOCUMENTS

| DE | 10110979 A1 | 9/2002 |
| EP | 0656719 A | 6/1995 |
| EP | 0688119 A1 | 12/1995 |
| EP | 1291784 A1 | 3/2003 |
| EP | 1335338 A | 8/2003 |
| FR | 2731290 A | 9/1996 |
| GB | 2315852 A | 11/1998 |
| WO | 2004047011 A | 6/2004 |

OTHER PUBLICATIONS

Akira Saito et al, "Smart Baton System: A Universal Remote Control System in Ubiquitous Computing Environment", The University of Tokyo, 2003.

* cited by examiner

*Primary Examiner* — Seung C Sohn
(74) *Attorney, Agent, or Firm* — Edward W. Goodman (57) ABSTRACT

A method for controlling a plurality of devices, the method including the steps of aiming a pointing device having a camera at an object representing a property of the device to be controlled and manipulating a control input on the pointing device to specify a degree of change for the property. The method further includes the steps of generating an image of a target area aimed at by the pointing device, interpreting the target area image to identify the chosen object, deducing the property of the device to be controlled based on the chosen object, and generating a control signal for the device to be controlled according to the degree of change for the deduced property.

10 Claims, 4 Drawing Sheets

METHOD AND SYSTEM FOR OPERATING A POINTING DEVICE TO CONTROL ONE OR MORE PROPERTIES OF A PLURALITY OF OTHER DEVICES

This invention relates in general to a method for control of a device, and, in particular, to a pointing device and device control interface for interacting with a device to be controlled.

The use of pointers, such as laser pointers or "wands" incorporating a laser light source to cause a light point to appear on a target at which the pointer is aimed, has become widespread in recent years. Such pointers are essentially passive devices, since they can only be used to point at objects, typically for pointing out items on a screen or projection to members of an audience. However, their use is limited to such situations, and they cannot be used, for example, to control a device.

A laser pointer combined with a control function is suggested in US 2003/178554A1. Here, a device to be controlled is equipped with a laser-actuated photo switch. A handheld laser sweeps past an active or sensitive area on the unit to cause the unit to change states, e.g. between 'on' and 'off'. This type of control system requires that the device to be controlled is equipped with such a laser-actuated photo-switch, rendering it unsuitable for control of devices that cannot be equipped with such a switch. If the laser pointer is to be used to control a number of devices, each of them has to be equipped with such a switch. Furthermore, the functionality of such a switch is characteristically limited to a simple toggling between two states of a property, such as on/off, and is less suitable for indicating a degree of change of such a property. The photo switch described is directly connected by means of wires to the device being controlled, so that the switch itself, to save unnecessary wiring, must be incorporated directly on the device itself. The laser pointer is effectively coupled with control of the device, i.e. the switch. Therefore, the user must point the laser pointer quite accurately at the switch in order to activate it. This implies that the user, in order to effect a change of state in the device, must physically approach the device and aim the laser pointer directly at the device. The user cannot, for example, control a device located in another room of the house using this type of laser pointer.

Therefore, an object of the present invention is to provide a more convenient and more flexibly applicable method of controlling any electronically or electrically controllable device with a pointing device.

To this end, the present invention provides a method for control of a device, which method comprises aiming a pointing device comprising a camera at an object representing a property of the device to be controlled and manipulating a control input on the pointing device to specify a degree of change for the property, generating an image of a target area aimed at by the pointing device, interpreting the target area image to identify the chosen object, deducing the property of the device to be controlled based on the chosen object, and generating a control signal for the device to be controlled according to the degree of change for the deduced property.

A pointing device for use in the method according to the invention comprises a camera for generating images of the target area in the direction in which the pointing device is aimed, and a control input for specifying a degree of change of a property.

For applying the method, a device control interface is also required, for interacting with the device to be controlled. Such a device control interface comprises at least an image analysis unit for analysing the images, a control signal generation unit for converting the degree of change into a control signal for the device to be controlled, and an application interface for communicating the control signals to the device to be controlled. As will be explained later, the device control interface can be incorporated in the pointing device or can be realised as an external unit, coupled with the pointing device by means of a suitable communication interface.

The method according to the invention opens whole new applications for a pointing device. Particularly, with the aid of such a pointing device, a user can cause properties, such as temperature, volume etc., of any electronically or electrically controllable device or application to be increased or decreased as appropriate, by simply aiming the pointing device in the general direction of the device or application, which does not require dedicated sensors or switches, thus effectively decoupling control of the device from the pointing device. This capability of the pointing device, together with its convenient pointing modality, combines to make the present invention a powerful and practical tool for myriad situations in everyday life.

The dependent claims and the subsequent description disclose particularly advantageous embodiments and features of the invention.

The object at which a user might aim the pointing device can be a device, such as a consumer electronics device, household appliance, or any type of electrical or electronically controlled device such as a light switch, a loudspeaker etc. Equally, the object can be any passive item representing the device to be controlled. For example, the user might aim the pointing device at a lamp, whereas the associated device to be controlled is in fact the light switch that turns this lamp on or off. The relationship between an object and the actual device which it represents might be predefined in a prior step of training the device control interface, which is preferably capable of controlling a number of devices or applications.

The camera for generating images of the object is preferably incorporated in the pointing device but might equally be mounted on the pointing device, and is preferably oriented in such a way that it generates images of the area in front of the pointing device targeted by the user. The camera might be constructed in a basic manner, or it might feature powerful functions such as zoom capability or certain types of filter.

Therefore, the 'target area' is the area in front of the pointing device which can be captured as an image by the camera. The image of the target area—or target area image—might cover only a small subset of the object aimed at, or it might encompass the entire object, or it might also include an area surrounding the object. The size of the target area image in relation to the entire object might depend on the size of the object, the distance between the pointing device and the object, and on the capabilities of the camera itself. The user might be positioned so that the pointing device is at some distance from the object, for example when the user is standing at the other end of the room. Equally, the user might hold the pointing device quite close to the object in order to obtain a more detailed image.

For intuitive use, the source of laser light is preferably directed so that the light point appears more or less in the centre of the target area. A source of a concentrated beam of light might be a laser light source, such as those used in many types of laser pointers currently available, and is preferably arranged in or on the pointing device in such a way that the concentrated beam of light can be directed at a point within the target area that can be captured by the camera. In the following, it is therefore assumed that the source of a concentrated beam of light is a laser light source, without limiting the scope of the invention in any way.

A property of a device is any property that can be altered by external influence, such as brightness of a lamp, temperature of a heating element, loudness of a loudspeaker, choice of menu options, etc. Properties of a consumer electronics device might include the currently selected radio or TV channel that can be altered by incrementing or decrementing a channel identifier. Other properties of such devices might be dialog items in a menu displayed on a screen, to be filled in by the usual increment/decrement functions. One example would be entering a 'Showview' number when programming a video recorder to record a movie. In this case, the objects representing certain properties are menu options from among which the user can choose by aiming the pointing device at the screen where the options are displayed.

To easily determine the object at which the user is aiming the pointing device, the image analysis unit of the device control interface preferably compares the image of the target area to a number of pre-defined templates, by applying the usual image processing techniques or computer vision algorithms. A single pre-defined template might suffice for the comparison, or it may be necessary to compare the image data to more than one template. Once the object has been identified in a template, the associated device, and the property that can be altered, can be deduced or determined as a result. For example, if the user is aiming the pointing device at a speaker box of a loudspeaker and simultaneously pressing the control input, the image of the speaker box is compared to templates until a match is found, so that the associated device—'loudspeaker' or, more probably, the amplifier driving the loudspeaker—can be identified and the associated property—'volume'—can be deduced.

Pre-defined templates can be stored in an internal memory of the device control interface, or might equally be accessed from an external source. Preferably, the device control interface comprises an accessing unit with an appropriate interface for obtaining pre-defined templates for the objects from, for example, an internal or external memory, a memory stick, an intranet or the internet. In this way, a manufacturer of an appliance which can be controlled by a pointing device according to the invention, can make templates for these appliances available to users of the devices. A template can be a graphic representation of any kind of object, such as an image of a loudspeaker, a radiator, a cooker, etc. If the objects are options of a menu displayed, for example on a television screen, a template might show the positions of a number of menu options for the television, so that, by analysing image data of the target area when the user aims the pointing device at the television, the image analysis unit can determine which option is being aimed at by the user.

According to the present invention, the user can cause a property of the device to be altered by manipulating a control input on the pointing device while aiming the pointing device at an object associated with the device. Such a control input can be a button, knob, dial etc., which the user can press, push or otherwise activate. Equally, the control input might comprise a touch-sensitive area on the pointing device which is capable of registering a touch administered by the user. By means of such a control input, the user can intuitively indicate any one of a number of possible 'directions' in which the property ought to be changed, such as 'up' or 'down', 'left' or 'right', 'plus' or 'minus', etc. A tracker ball or joystick type of control input, on the other hand, can increase the number of possibilities for objects which can be rotated or moved in an number of directions, for example stage-lighting elements as used in theatres etc., or other motorized appliances or toys. An additional button might be included on the pointing device to indicate that a selection is being made. For example, the user might navigate through levels of a menu hierarchy by means of an up/down control input to arrive at a certain menu item, and then indicate that item by pressing the additional button.

The user indicates the degree by which the relevant property should be changed by appropriate manipulation of the control input. For example, by pressing only briefly a control input in the form of a button, the user indicates that the associated property is only slightly to be changed. On the other hand, should the user maintain pressure on the button, or repeatedly press the button, he indicates that the property should be changed by a proportionally greater degree. This 'degree of change' is output by the control input in the form of a signal.

Preferably, a device control interface for interacting with the device(s) to be controlled might be incorporated in the pointing device. In this case, the device control interface does not need a receiver, since it can obtain the images and degree of change directly from the camera and control input, respectively. The image analysis and control signal generation can take place in the pointing device, and the control signals can be transmitted in appropriate form from the pointing device directly to the device to be controlled.

On the other hand, since the capabilities of these units might be limited by the physical dimensions of the pointing device, which is preferably realised to be held comfortably in the hand, such an image analysis unit might suffice for rudimentary image analysis only, while more advanced image processing, necessitating a larger unit, might, along with the control signal generation, take place in an external device control interface.

In a particularly preferred embodiment of the invention, the pointing device incorporates a device control interface as well as a transmitter for transmitting images and degree of change information to an external device control interface. Alternatively, the pointing device might altogether dispense with image analysis and control signal generation functions, allowing these tasks to be carried out by the external device control interface, thereby allowing the pointing device to be realised in a smaller, more compact form.

An external device control interface as described above might be a stand-alone device or might be incorporated into an already existing home entertainment device, a personal computer, or might be realised as a dedicated device control interface. To receive information from the pointing device, the external device control interface features a receiving unit for receiving images and degree of change. A device control interface in a home environment might be realised so that the image processing and control signal generation take place centrally, whilst a number of receiving units, distributed about the home, can receive image data and degree of change from any number of locations. Equally, a number of application interfaces, also distributed about the home, can transmit control signals to the devices or appliances located in any room. Thus, the user can aim the pointing device at an object in one room to control a device located in a different room.

Clearly, the device control interface is not limited to use with a single pointing device. Any number of pointing devices might be used to send image data and degree of change information to the device control interface. Every member of a family might be supplied with such a pointing device. An advanced realisation might foresee the pointing device sending an authorization code along with image data and degree of change, so that, for example, a small child does not inadvertently turn up the heating. The authorization code might be hardwired in the pointing device, or might be entered by the user in some way, for example by means of the control input.

To maximise the usefulness of the pointing device and the device control interface, the user might train the device control interface to recognise objects and to associate them with particular devices to be controlled. To this end, the device control interface might feature a user interface such as keyboard or keypad so that the user can input information regarding the template images or device control parameters. For example, the user might take a picture of radiator in his home, using a camera or even the camera of the pointing device, and transfer the image to the internal memory of the device control interface. By means of suitable input commands to the device control interface, for example by entering commands via a keyboard or keypad, the user can assign the image of the radiator object to the appropriate device, in this case the heating system. In this way, the user can assign any object to any device, or may assign a number of different objects to a device. For instance, the user might assign an image of a lamp, as well as an image of the switch controlling this lamp, to the light switch, which is in effect the device to be controlled. Aiming the pointing device at either of these objects while manipulating the control input has the effect of controlling the light switch. Similarly, the user might assign images of any or all of the radiators in his home to the heating system device, so that he can use the pointing device to control the heating by aiming it at a radiator in any room and manipulating the control input. Furthermore, the type of action might be specified by pointing at a certain part of the object, where different parts of the object are associated with different properties. For example, pointing at the thermostat of a radiator might indicate that the temperature of this radiator only is to be adjusted, whereas pointing at the body of the radiator would imply that the degree of change is to be applied to all the radiators of the heating system.

The image of the target area might comprise image data concerning only significant points of the entire image, e.g. enhanced contours, corners, edges etc., or might be a detailed image with picture quality. For processing the image data in order to determine the object at which the user is aiming the pointing device, it is expedient to apply computer vision techniques to find a point in the object at which the user has aimed, i.e. the target point.

Since the image of the target area might contain other items or objects besides the actual object at which the user is aiming the pointing device, the chosen object is preferably determined by identifying the object in the image which contains or encompasses a particular target point in the target area. In one embodiment of the invention, a fixed point in the target area image, preferably the centre of the target area image, obtained by extending an imaginary line in the direction of the longitudinal axis of the pointing device to the object, might be used as the target point.

A method of processing the target area images of the object using computer vision algorithms might comprise detecting distinctive points in the target image, determining corresponding points in the template of the object, and developing a transformation for mapping the points in the target image to the corresponding points in the template. The distinctive points of the target area image might be distinctive points of the object or might equally be points in the area surrounding the object. This transformation can then be used to determine the position and aspect of the pointing device relative to the object so that the intersection point of an axis of the pointing device with the object can be located in the template. The position of this intersection in the template corresponds to the target point on the object and can be used to easily determine which object has been targeted by the user. In this way, comparing the target area image with the pre-defined template may be restricted to identifying and comparing only salient points such as distinctive corner points. The term "comparing" as applicable in this invention is to be understood in a broad sense, i.e. by only comparing sufficient features in order to quickly identify the object at which the user is aiming.

Another possible way of determining an object selected by the user is to directly compare the received target area image, centred around the target point, with a pre-defined template to locate the point targeted in the object using methods such as pattern-matching.

In a further embodiment of the invention, the location of the laser point, fixed at a certain position in the target area and transmitted to the receiver in the control unit as part of the target area image, might be used as the target point to locate the object selected by the user. The laser point, which appears when the beam of laser light impinges on the object aimed at by the use, may coincide with the centre of the target area image, but might equally well be offset from the centre of the target area image.

The invention thus provides, in all, an easy and flexible way to control any type of electrically or electronically controllable device. For ease of use, the pointing device can be in the shape of a wand or pen in an elongated form that can be grasped comfortably by the user. The user can thus direct the pointing device at an object while positioned at a distance from it. Equally, the pointing device might be shaped in the form of a pistol. Furthermore, an additional light source might be mounted in or on the pointing device, serving to illuminate the area at which the pointing device is aimed, so that the user can easily locate an object, even if the surroundings are dark.

The pointing device and device control interface combine to give a powerful control system, for use in practically any kind of environment. For instance, it is conceivable that the system might find use in a hotel environment, where a guest can use the pointing device to control unfamiliar appliances in his hotel room in a convenient and intuitive manner, without first having to familiarise himself with their functions.

Other objects and features of the present invention will become apparent from the following detailed descriptions considered in conjunction with the accompanying drawing. It is to be understood, however, that the drawings are designed solely for the purposes of illustration and not as a definition of the limits of the invention.

In the drawings, like numbers refer to like objects throughout. The pointing device described is held and operated by a user, not shown in the drawings.

Figure 1:
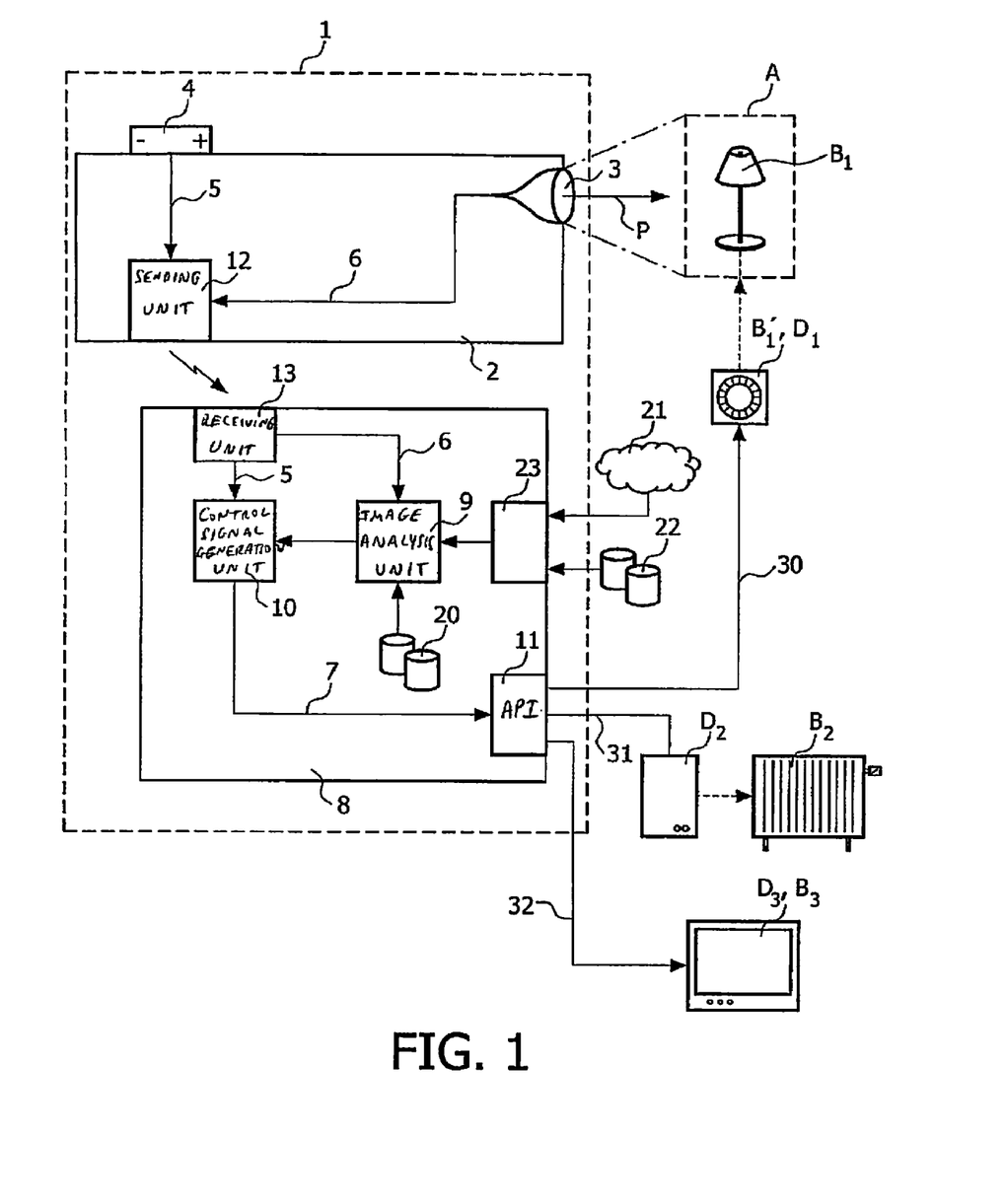
FIG. 1 is a schematic diagram of a system including a pointing device and a device control interface for controlling a number of devices in accordance with an embodiment of the present invention.

FIG. 1 shows a system for controlling a number of devices $D_1$, $D_2$, $D_3$, comprising a pointing device 2 and an external device control interface 8.

The pointing device 2 contains a camera 3 which generates images 6 of the area in front of the pointing device 2 in the direction of pointing P. The pointing device 2 features an elongated form in this embodiment, so that the direction of pointing P lies along the longitudinal axis of the pointing device 2. The camera 3 is positioned towards the front of the pointing device 2 so that images 6 are generated of the area in front of the pointing device 2 at which a user, not shown in the diagram, is aiming.

The user can aim the pointing device 2 at any of a number of objects $B_1$, $B_1'$, $B_2$, $B_3$. The objects shown in the figure are a lamp $B_1$, a dimmer light switch $B_1'$ for this lamp $B_1$, a radiator $B_2$ and a television $B_3$. Each of the objects $B_1$, $B_1'$, $B_2$, $B_3$ is associated with a one of a number of devices $D_1$, $D_2$, $D_3$.

In this example, the user is aiming the pointing device 2 at a lamp $B_1$, and manipulates a control input 4 to indicate that the brightness of the lamp $B_1$ should be increased or decreased. Here, the control input 4 is a plus/minus or +/− type of button, so that the user presses the "+" part to indicate an increase in brightness, or the "−" part to indicate a decrease in brightness. If the user had aimed the pointing device 2 at the radiator $B_2$, pressing the "+" part would intuitively mean to turn up the heating, whereas pressing the "−" part would imply that the heating is to be reduced.

More than one object can represent a device to be controlled. In FIG. 1, the dimmer switch $D_1$, which is the actual device for controlling the brightness of the lamp, is represented by both itself as object $B_1'$ and by the lamp $B_1$. It is intuitive for the user to point directly at the lamp $B_1$ and not at the dimmer, since, after all, it is the brightness of the lamp $B_1$ that he wishes to alter.

The extent to which the user manipulates the control input 4 indicates the amount of change desired by the user. By simply pressing "+" once, for example, the user indicates that a slight increase in brightness is desired. On the other hand, by repeatedly pressing "+", or by maintaining pressure on "+" for a longer time, he can indicate that the brightness of the lamp $B_1$ should be increased considerably or to its maximum. The type and duration of manipulation, i.e. the degree of change 5, is output from the control unit 4, typically as an electronic signal.

The degree of change 5, together with one or more images 6 of the object $B_1$ generated by the camera 3, are transmitted in a wireless manner, e.g. Bluetooth, 802.11b or mobile telephony standards, by a sending unit 12 to a device control interface 8. Here, the images 6 are analysed by an image analysis unit 9.

To identify the object $B_1$, $B_1'$, $B_2$, $B_3$ aimed at by the user, the images 6 are compared to templates which the image analysis unit 9 can retrieve as required from a database 20 or an external source 21, 22 via an accessing unit 23. Ideally, the accessing unit 23 has a number of interfaces allowing access to external data, for example the user might provide predefined templates stored on a memory medium 22 such as floppy disk, CD or DVD, or the accessing unit 23 might retrieve suitable template information from an external network such as the internet 21, or from the manufacturer of the device. The templates may also be configured by the user, for example in a training session in which the user specifies the correlation between a device to be controlled $D_1$, $D_2$, $D_3$ and an object $B_1$, $B_1'$, $B_2$, $B_3$. The templates might show the objects $B_1$, $B_1'$, $B_2$, $B_3$ superimposed on a background. In the case of a radiator, the template for the radiator might be an image showing the actual radiator as well as its surroundings, such as wallpaper, window, furniture etc. A more simple template might just show a radiator without any surroundings.

The image analysis unit 9 makes use of known image processing techniques to find the template most closely matching the image 6, thus identifying the object $B_1$, $B_1'$, $B_2$, $B_3$ being pointed at and the associated device $D_1$, $D_2$, $D_3$ to be controlled. This information is forwarded to a control signal generation unit 10, which can now interpret the degree of change 5 received from the receiving unit 13 to deduce the property to be adjusted. In this example, property must be 'brightness', since the identified object is the lamp $B_1$, and the associated device $D_1$ is the dimmer switch. The control signal generation unit 10 generates an appropriate control signal 7, which is then forwarded to an application interface 11. The application interface 11, which drives a number of applications or devices $D_1$, $D_2$, $D_3$, each possibly requiring different types of signal 30, 31, 32, can perform any necessary conversion to the control signal 7 in order to give a signal 30, 31, 32 suitable for the actual device $D_1$, $D_2$, $D_3$. In this case, the control signal 7 is converted into a form suitable for driving the dimmer $D_1$.

The devices $D_1$, $D_2$, $D_3$ shown in the diagram may be located close to each other or may be distributed over different rooms of a house. The application interface 11 of the device control interface 8 is capable of communicating with the devices by means of suitable interfaces, so that a device such as a heating system $D_2$ can be controlled from, for example, the living room, even though the heating system $D_2$ itself might be located in the cellar of the house. Such an interface might be wired, such as a bus or a local communication network, or might be a wireless connection such as a wireless LAN network, Bluetooth, etc. The application interface 11 communicates the control signal 7 generated by the control signal generation unit 10, in the form of a suitable signal 30, 31, 32, to the appropriate device $D_1$, $D_2$, $D_3$.

The pointing device 2 might continually send images 6 and degree of change 5 to the device control interface 8, or might cease transmission automatically if it is not moved for a certain length of time. To this end, the pointing device 2 might comprise a motion sensor, not shown in the diagram. Since the pointing device 2 is most likely powered by batteries, also not shown in the diagram, it is expedient to only transmit data to the device control interface when the user actually manipulates the control unit 4, in order to prolong the lifetime of the batteries. Transmission of image data 6 and degree of change 5 might be initiated as soon as the user manipulates the control unit 4 in any way, and might automatically cease thereafter.

Figure 2:
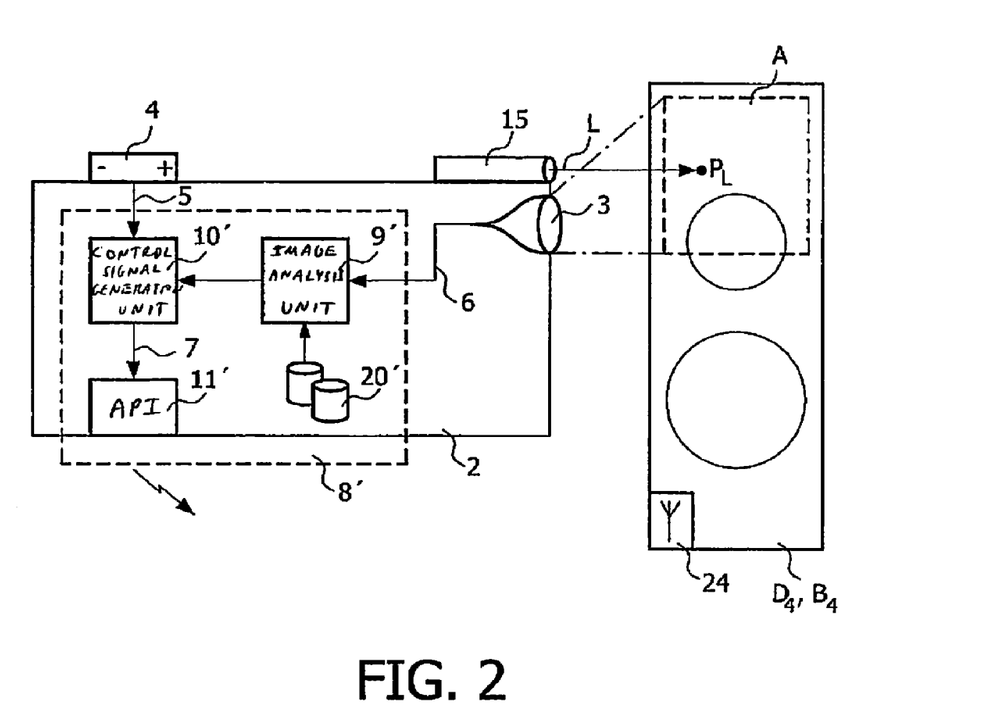
FIG. 2 is a schematic diagram of a pointing device and a device to be controlled in accordance with an embodiment of the present invention.

FIG. 2 shows an alternative embodiment of the pointing device 2, featuring its own image analysis unit 6' and control signal generator unit 10' in its own local device control interface 8'. This pointing device 2 can analyse image data 9 and degree of change 5 generated by its camera 3 and control input 4 respectively, to locally generate control signals 7 for the appropriate device $D_1$, $D_2$, $D_3$.

In this figure, the pointing device 2 is being aimed at an object $B_4$, in this case the front of a loudspeaker $D_4$, which comprises the visible part of the actual device $D_4$ itself. With the aid of a light point $P_L$ issuing from a source 15 of laser light, the user can aim the pointing device 2 at the object $B_4$, in order to generate images 6 of a target area A. It is not necessary for the entire object $B_4$ to appear within the target area A, a part of the object $B_4$ suffices for identification, as illustrated in the diagram. The images 6 are analysed in the image analysis unit 9' to identify the object $B_4$ at which the pointing device 2 is aimed. The user can manipulate the control input 4 of the pointing device 2 in order to effect some change in the loudness of the loudspeaker $D_4$. The degree of change 5 output by the control input 4 is processed in the control signal generator 8' along with the results of the image analysis, to give appropriate control signals 7 for the device $D_4$. Different parts of the loudspeaker $D_4$ might be associated with different properties, for example, aiming towards the top of the loudspeaker box $D_4$ might indicated that the treble is to be increased or decreased, whereas aiming towards the bottom would indicate that the bass is to be altered. The part of the loudspeaker $D_4$ actually aimed at is identified by the image analysis unit 9'.

The control signals 7 undergo any necessary conversion into a form understandable by the loudspeaker $D_4$ before being transmitted to the loudspeaker $D_4$ by the application interface 11'. For ease of use, the application interface 11' communicates in a wireless manner with the loudspeaker $D_4$, which is equipped with an appropriate receiver 24 for receiving signals from the pointing device 2. More probably, such a receiver 24 would be connected to or be part of an amplifier driving the loudspeaker $D_4$, but is shown in the diagram to be incorporated in the loudspeaker $D_4$ for the sake of simplicity.

As illustrated in FIG. 2, being able to perform the image processing locally means the pointing device 2 does not necessarily need to communicate with a separate device control interface 8 as described in FIG. 1. Since the quality of the image analysis might be limited by the physical dimensions of the pointing device 2, which will most likely be realised in a small and practical format, this "stand-alone" embodiment might suffice for situations in which the accuracy of the image analysis is not particularly important, or in situations where the pointing device 2 is unable to communicate with an external device control interface 8.

This embodiment may of course be simply an extension of FIG. 1, so that the pointing device 2, in addition to the local device control interface 8', also avails of the communication interfaces 12 described in FIG. 1, allowing it to operate in conjunction with an external device control interface 8, such as a home dialog system, in addition to its stand-alone functionality. This embodiment might also feature a local memory 20' in which the pointing device 2 can store images generated by the camera 3. By means of a suitable interface, not shown in the diagram, the pointing device 2 might be able to load templates obtained from an external source, such as a memory stick, the internet, the external device control interface 8 etc., into the local memory 20'.

Some possible realisations of a control input for a pointing device 2 are shown in FIGS. 3a-3d. The direction of pointing P is indicated in each diagram.

Figure 3A:
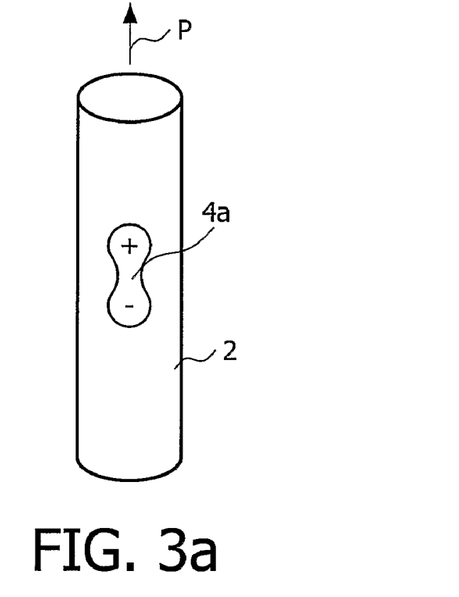
FIG. 3a is a schematic diagram of a pointing device in accordance with an embodiment of the present invention.
Figure 3B:
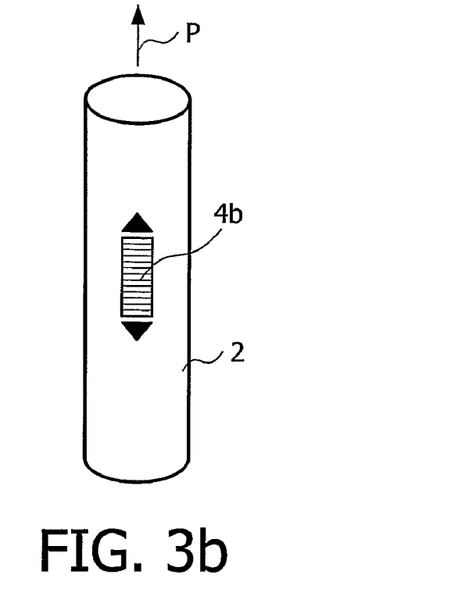
FIG. 3b is a schematic diagram of a pointing device in accordance with an embodiment of the present invention.

In FIG. 3a, the control input is realised as a simple +/− or up/down button 4a of the type often seen on remote controls for changing controls such as volume. FIG. 3b features a control input in the form of a dial 4b, such as the type of dial often found between the left and right buttons on a mouse, and used for easy scrolling in any one of two direction.

Figure 3C:
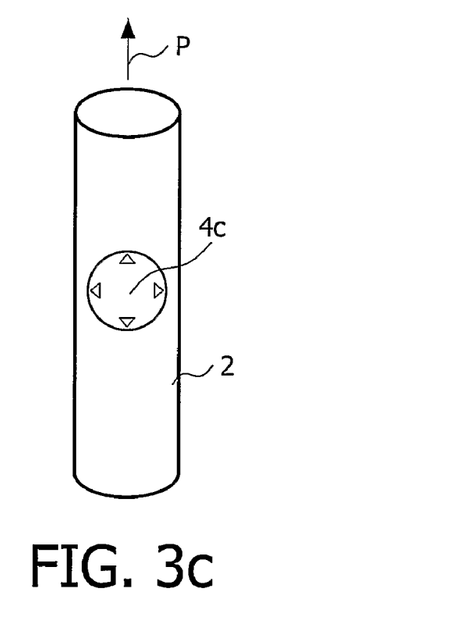
FIG. 3c is a schematic diagram of a pointing device in accordance with an embodiment of the present invention.
Figure 3D:
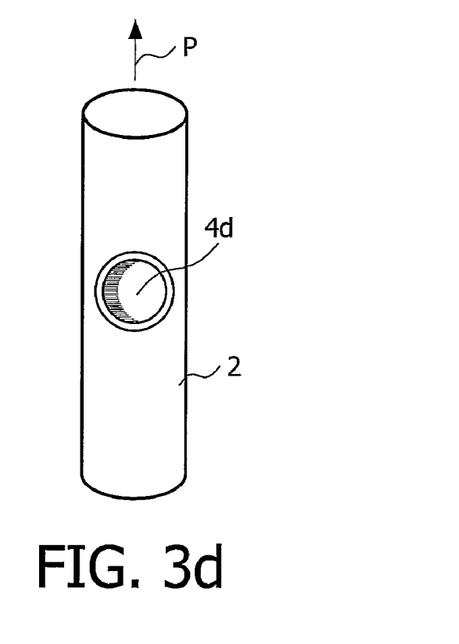
FIG. 3d is a schematic diagram of a pointing device in accordance with an embodiment of the present invention.

FIGS. 3c and 3d feature control inputs 4c and 4d respectively, which can be used to indicate degree of change in more than just two directions. The control input 4c can be used to indicate a degree of change in any of four directions—up, down, left and right. The tracker ball 4d is even more versatile, since it can be moved in practically any direction.

Figure 4:
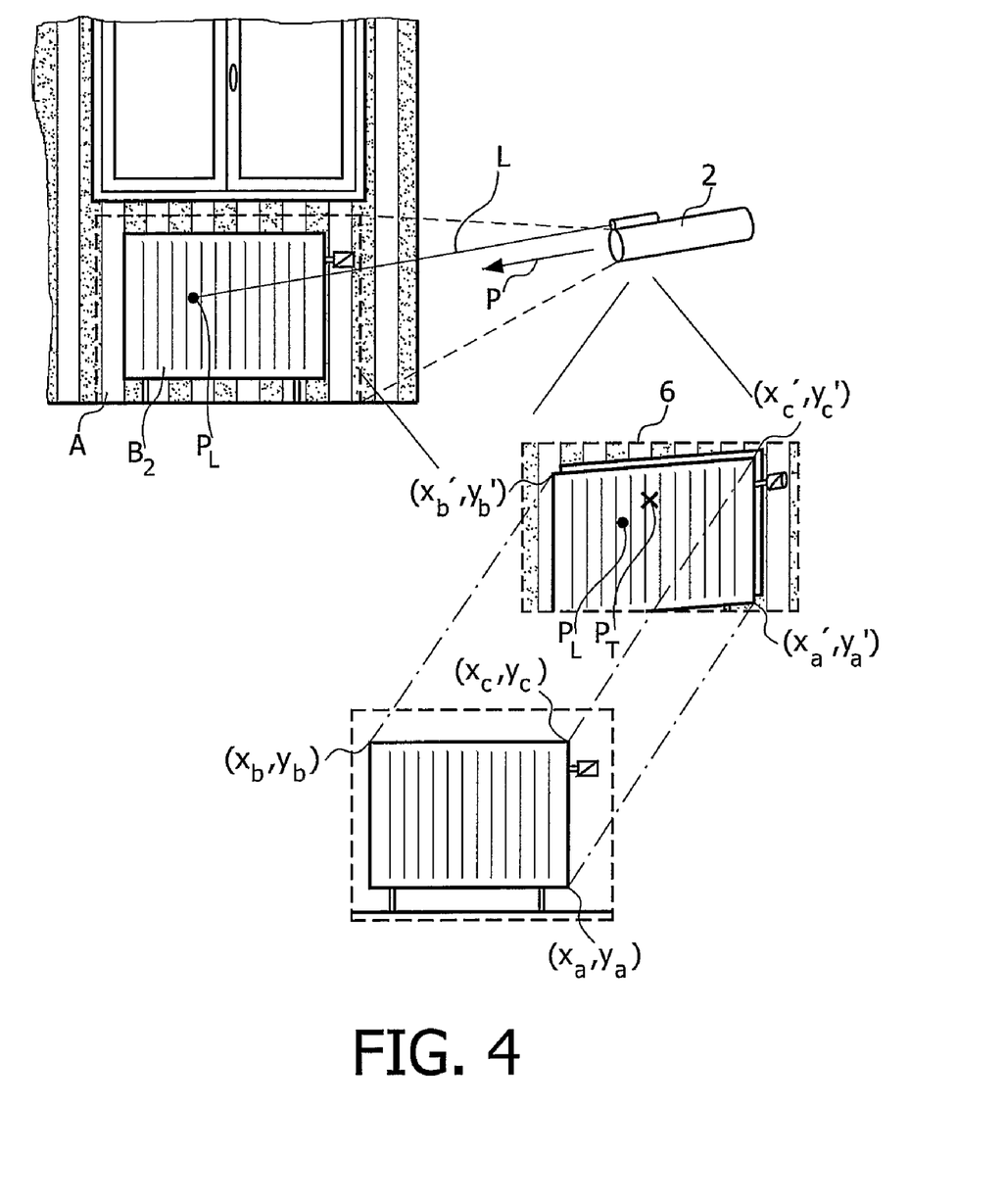
FIG. 4 is a schematic diagram showing an object, its associated template, and a target area image generated by a pointing device in accordance with an embodiment of the present invention.

The user will not always aim the pointing device 2 at an object from directly in front—it is more likely that the pointing device 2 will be aimed at a more or less oblique angle to the object, since it is often more convenient to aim the pointing device 2 than it is to change one's own position. This is illustrated in FIG. 4, which shows a schematic representation of a target area image 6 generated by a pointing device 2, aimed at the object $B_2$ from a distance and at an oblique angle, so that the scale and perspective of the object $B_2$ in the target area A, in this case a radiator $B_2$, appear distorted in the target area image 6.

Regardless of the angle of the pointing device 2 with respect to the object $B_2$, the target area image 6 is always centred around a target point $P_T$. The laser point $P_L$ also appears in the target area image 6, and may be a distance removed from the target point $P_T$, or might coincide with the target point $P_T$. The image processing unit of the device control interface compares the target area image 6 with predefined templates T to determine the object $B_2$ being pointed at the user.

To this end, the point of intersection $P_T$ of the longitudinal axis of the pointing device 2 with the object $B_2$ is located in the target area image 6. The point in the template T corresponding to the point of intersection $P_T$ can then be located.

Computer vision algorithms using edge- and corner detection methods are applied to locate points $[(x_a',y_a'),(x_b',y_b'), (x_c',y_c')]$ in the target area image 6 which correspond to points $[(x_a,y_a),(x_b,y_b), (x_c,y_c)]$ in the template T of the object $B_2$.

Each point can be expressed as a vector e.g. the point $(x_a,y_a)$ can be expressed as $v\vec{v}_a$. As a next step, a transformation function $T_\lambda$ is developed to map the target area image 6 to the template T:

$$f(\lambda) = \sum_i \left| T_\lambda(\vec{v}_i) - \vec{v}'_i \right|^2$$

where the vector $\vec{v}_i$ represents the coordinate pair $(x_i,y_i)$ in the template T, and the vector $\vec{v}'_i$ represents the corresponding coordinate pair $(x'_i, y'_i)$ in the target area image 6 The parameter set λ, comprising parameters for rotation and translation of the image yielding the most cost-effective solution to the function, can be applied to determine the position and orientation of the pointing device 2 with respect to the object $B_2$. The computer vision algorithms make use of the fact that the camera 3 within the pointing device 2 is fixed and "looking" in the direction of the pointing gesture. The next step is to calculate the point of intersection $P_T$ of the longitudinal axis of the pointing device 2 in the direction of pointing P with the object $B_2$. This point may be taken to be the centre of the target area image 6. Once the coordinates of the point of intersection have been calculated, it is a simple matter to locate this point in the template T.

Although the present invention has been disclosed in the form of preferred embodiments and variations thereon, it will be understood that numerous additional modifications and variations could be made thereto without departing from the scope of the invention. The pointing device can serve as the universal user interface device in the home or any other environment with electrically or electronically controllable devices. In short, it can be beneficial wherever the user can express an intention by pointing. Its small form factor and its convenient and intuitive pointing modality can elevate such a simple pointing device to a powerful universal remote control. As an alternative to the pen shape, the pointing device could for example also be a personal digital assistant (PDA) with a built-in camera, or a mobile phone with a built-in camera.

For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method for controlling at least one device of a plurality of devices, the method comprising the steps of:
   enabling a user to manually handle and point at a local site a pointing device including a camera at an object representing a property of the at least one device of the plurality of devices to be controlled;
   manipulating a control input on the pointing device to specify a degree of change for the property;
   generating an image of a target area of the at least one device of the plurality of devices aimed at by the pointing device;
   interpreting the target area image to identify the chosen object;
   deducing the property of the at least one device of the plurality of devices to be controlled based on the chosen object;
   associating an authorization code with said pointing device; and
   generating a control signal for the at least one device of the plurality of devices to be controlled according to the degree of change for the deduced property based on the authorization code.

2. The method according to claim 1 wherein the chosen object is determined by identifying an object in the image which contains a particular target point in the target area.

3. The method according to claim 1 wherein the image of the target area is analysed by comparing the image to a predefined template to identify the chosen object at which the pointing device is aimed.

4. The method according to claim 1, where multiple devices of the plurality of devices are controllable by the pointing device and the step of deducing the property of the device includes determining a chosen device of the plurality of devices.

5. A pointing device, comprising:
   a camera for generating images of a target area in the direction in which the pointing device is aimed by a user manually handling the pointing device at a local site; and
   a control input for specifying a degree of change of a property of at least one device of a plurality of devices, wherein the degree of change is transmitted to the at least one device of said plurality of devices based on an authorization code associated with said pointing device.

6. The pointing device according to claim 5, further comprising a source of a concentrated beam of light for generating a light point within the target area.

7. The pointing device according to claim 5, wherein the control input is manipulated in any one of a number of directions.

8. The pointing device according to claim 5, further comprising a device control interface for interacting with the at least one device of the plurality of devices to be controlled, the device control interface comprising:
   an image analysis unit for analysing images;
   a control signal generation unit for converting a degree of change into a control signal for the at least one device of the plurality of devices to be controlled; and
   an application interface for communicating the control signal to the at least one device of the plurality of devices to be controlled.

9. The pointing device according to claim 5, further comprising a communication interface for transferring either images or degree of change to a device control interface which generates a control signal for the at least one device of the plurality of devices to be controlled based on the images or the degree of change.

10. A device control interface for interacting with a device to be controlled, comprising:
    a receiving unit for receiving images and degree of change from a pointing device;
    an image analysis unit for analysing the images;
    a control signal generation unit for converting the degree of change into a control signal for the device; and
    an application interface for communicating the control signals to the device,
    wherein the control signals are communicated to the device based on an authorization code associated with said pointing device; and
    wherein the pointing device is aimed by a user manually handling the pointing device at a local site.

* * * * *